United States Patent
Kagawa

(10) Patent No.: US 7,073,842 B2
(45) Date of Patent: Jul. 11, 2006

(54) FITTING STRUCTURE OF A WINDOW MOLDING

(75) Inventor: Mamoru Kagawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/467,728

(22) PCT Filed: May 2, 2003

(86) PCT No.: PCT/JP03/05607

§ 371 (c)(1),
(2), (4) Date: Aug. 11, 2003

(87) PCT Pub. No.: WO04/000593

PCT Pub. Date: Dec. 31, 2003

(65) Prior Publication Data

US 2004/0212216 A1 Oct. 28, 2004

(30) Foreign Application Priority Data

Jun. 21, 2002 (JP) .............................. 2002-180716

(51) Int. Cl.
*B60J 1/02* (2006.01)
(52) U.S. Cl. ............... 296/146.15; 296/93; 52/204.597
(58) Field of Classification Search ................. 296/93, 296/146.15; 52/208, 204.591, 204.597
See application file for complete search history.

(56) References Cited

U.S. PATENT DOCUMENTS

| 5,480,504 A | * | 1/1996 | Gold ............................ 156/108 |
| 5,538,314 A | * | 7/1996 | Young et al. ........... 296/146.15 |
| 5,688,016 A | | 11/1997 | Gold ............................ 296/93 |
| 5,803,527 A | | 9/1998 | Fujiya ........................... 296/93 |
| 6,095,586 A | | 8/2000 | Yada et al. .................... 296/93 |
| 6,196,615 B1 | * | 3/2001 | Yada ............................ 296/93 |
| 6,227,598 B1 | * | 5/2001 | Ichioka et al. ................ 296/93 |
| 6,257,643 B1 | * | 7/2001 | Young ........................... 296/93 |
| RE37,737 E | * | 6/2002 | Yada ............................ 296/93 |

FOREIGN PATENT DOCUMENTS

| EP | 1 104 711 | 6/2001 |
| JP | 5-139158 | 6/1993 |
| JP | 09-066739 | 3/1997 |
| JP | 9-150630 | 6/1997 |
| JP | 2002-127742 | 5/2002 |
| WO | WO 01/42036 A1 | 6/2001 |

* cited by examiner

*Primary Examiner*—Stephen Gordon
(74) *Attorney, Agent, or Firm*—Hamre, Schumann, Mueller & Larson, P.C.

(57) ABSTRACT

A fitting structure of window molding 1 equipped with base part 2 fitted into the circumferential edge of window glass G, and seal lip part 3 which extends toward body panels P from the base part 2, to be contacted with the surface of the body panel P, wherein notch 12 is formed at an inside of a vehicle body between the base part 2 and the seal lip part 3, and seal member 11 is formed between the base part 2 side from the notch 12 and the body panes P in the window molding 1, to thereby prevent the fall of fitting rigidity of the window molding in fitting the window molding having a notch formed therein, and suppress a float force of a seal lip part, is provided.

5 Claims, 3 Drawing Sheets

FITTING STRUCTURE OF A WINDOW MOLDING

TECHNICAL FIELD

This invention relates to a fitting structure of a window molding attached to a circumferential edge of window glass in a vehicle or the like.

BACKGROUND ART

Technology disclosed in JP-A-09-66739 is mentioned as a conventional example of a fitting structure of a window molding fitted into the circumferential edge of window glass in vehicles. FIG. 4 is a schematic diagram in cross section for explaining the conventional fitting structure. Window molding 21 includes base part 22 which is fitted into the circumferential edge of the window glass G, and seal lip part 23 which extends toward the body panels P from this base part 22 and contacts with the surface of the body panels P, having thinning portion (notch part 24) formed at an inside of a vehicle body between the base part 22 and the seal lip part 23. Float force from the body panels P of the seal lip part 23 is suppressed by interposing this notch part 24 therebetween, omitting a detailed explanation here.

However, according to the above-described fitting structure, the formed notch part 24 resulted in forming a thin part in the window molding 21. This posed a possibility that the fitting rigidity falls, on fitting of the window molding 21. Therefore, there was raised a problem such that the formation place of the notch part 24 was limited locally, such as the corner made by the roof part and a front pillar part of the vehicle body only.

Moreover, if hollow part 25 of the body inner side blockaded by the seal lip part 23 exists, air is sucked out of the hollow part 25 outside for example during a vehicle run, due to the internal and external atmospheric pressure difference sandwiching the seal lip part 23. In this circumstance, float force phenomenon of the seal lip part 23 from the body panels P may be repeated. Accordingly, as described above, when notch part 24 is formed, the capacity of the part and the hollow part 25 becomes large, with the amount of air sucked out also being increased accordingly, raising another problem that float force of the seal lip part 23 is likely to be large.

In order to overcome the above-described problem, this invention is devised, and the object thereof resides in providing a fitting structure of a window molding capable of preventing its fall of fitting rigidity in fitting the window molding having a notch formed therein, and suppressing the float force of a seal lip part.

DISCLOSURE OF THE INVENTION

This invention proposes a fitting structure of a window molding equipped with a base part fitted into the circumferential edge of window glass, and a seal lip part which extends toward body panels from the base part, contacting with the front surface of the body panels, wherein a notch is formed at an inside of a vehicle body between the base part and the seal lip part, and a seal member is provided between the base part side from the notch in a window molding and the body panels.

According to the above-described arrangement, a window molding will be supported by the body panels through a seal member, and even when the rigidity of the window molding itself falls by formation of the notch part, the fitting rigidity of the window molding will increase on fitting thereof. Moreover, capacity of the hollow part of the inner side blockaded by the seal lip part can be made small by providing a seal member. This allows the amount of air to be decreased when the air is sucked out of the hollow part due to an internal and external atmospheric pressure difference, with the float force of the seal lip part also suppressed accordingly.

Moreover, according to the constitution where the seal lip part is contacted with the body panels in a distal end thereof, and contacted with the seal member in a proximal end thereof, the seal lip part will be supported in two places of the body panels and the seal member. This maintains the form of a seal lip part stably, reducing fatigue due to the deformation. In addition, the hollow part of the inner side blockaded by the seal lip part can be divided into pluralities of hollow parts, to thereby further reduce the amount of air sucked out outside, and further suppress the float force of the seal lip part.

Also, according to the constitution where the seal lip part is contacted with the seal member in a flat surface formed at an inside of a vehicle body, the seal lip member is contacted with the seal member 11 in a stabilized field contact, to thereby raise the mutual sealing performance of the hollow parts divided in pluralities, and the sucking of the air of only a predetermined hollow part is ensured. Moreover, since the support area of the seal lip part becomes large, the stability of the form of the seal lip part improves and fatigue due to the deformation can be reduced more.

MODE(S) FOR CARRYING OUT THE INVENTION

Modes for carrying out the invention will be explained in conjunction with the drawings.

Figure 1:
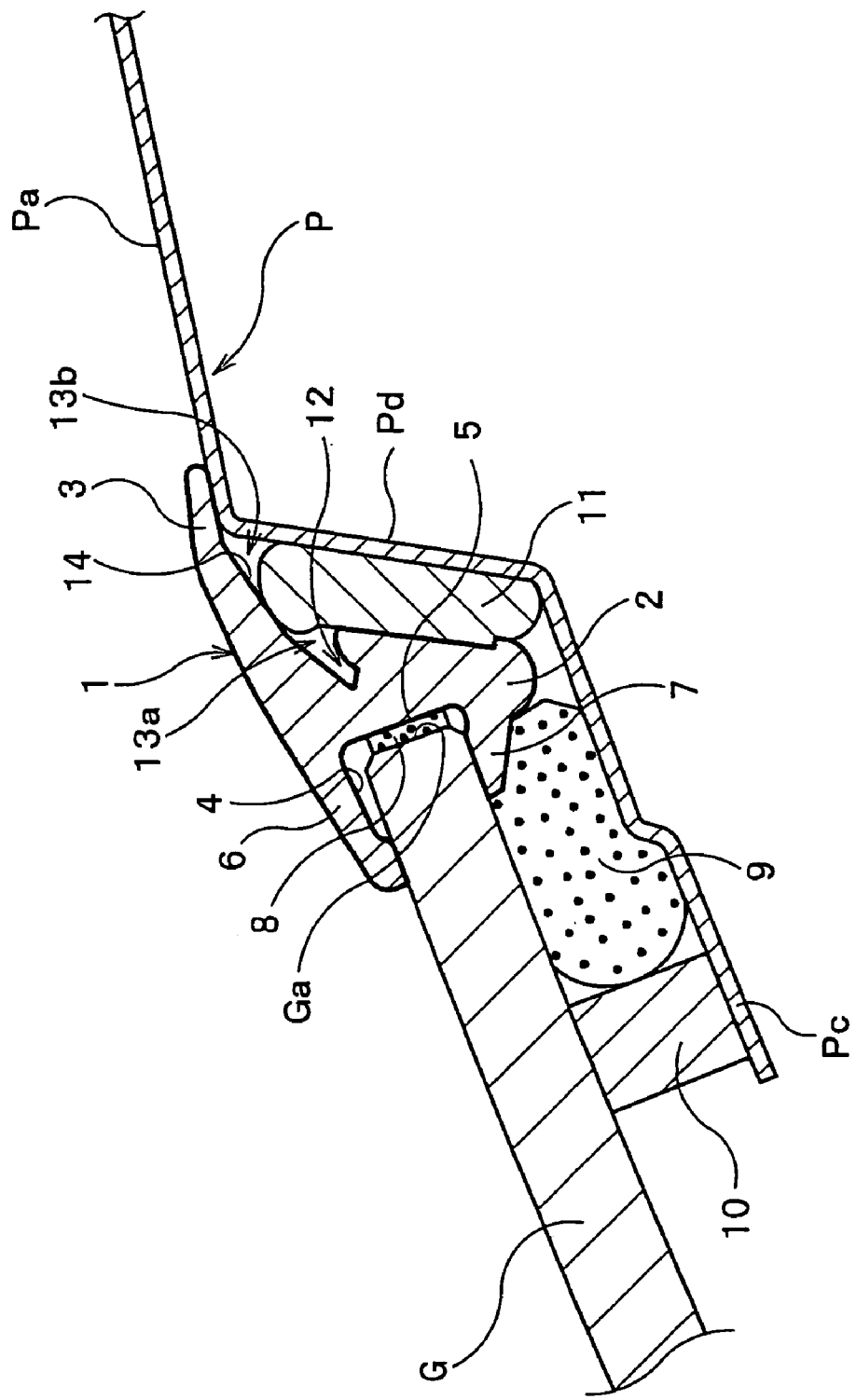
FIG. 1 is a sectional explanatory view showing the fitting structure of a window molding when attaching to a vehicle body, and sectional view taken along the line A—A in FIG. 3.
Figure 3:
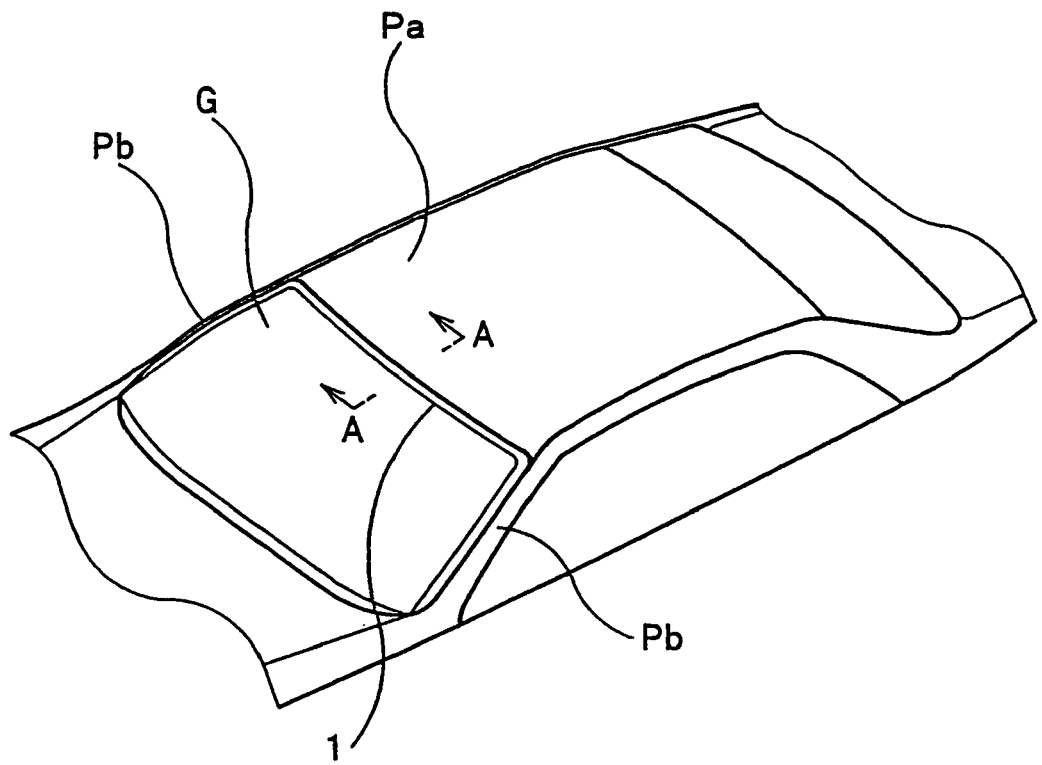
FIG. 3 is a partial perspective overview of a vehicle.
Figure 4:
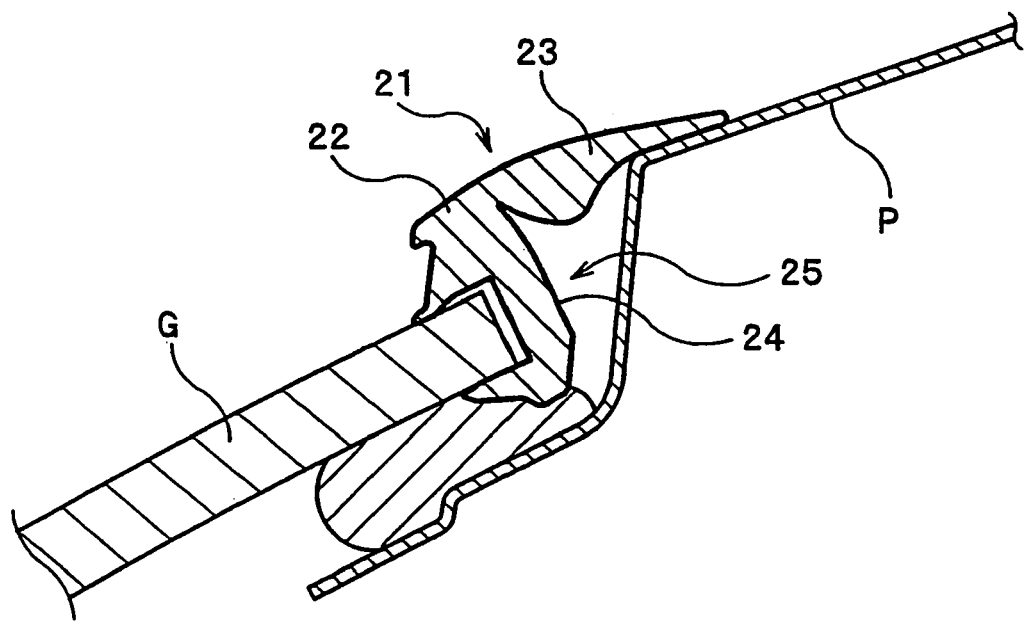
FIG. 4 is a sectional explanatory view showing a fitting structure of a window molding.

As shown in FIG. 1, circumferential edges of the window glass G of a front is equipped with window molding 1 fabricated from synthetic resin material, rubber material or the like, and the clearance between the body panels P which constitute the roof part Pa, the front pillar Pb (FIG. 3) or the like, and the circumferential edges of the window glass G is sealed by the window molding 1.

Window molding 1 is equipped with the base part 2 attached to the circumferential edge of the window glass G, and the seal lip part 3 of the tab protrusion in sectional view which extends from this base part 2 toward the body panels P (the roof part Pa side in FIG. 1), to be contacted with the surface (surface of the roof part Pa in FIG. 1) of the body panels P.

The base part 2 includes fitting groove 4 for fitting into the circumferential edge of the window glass G in sectional view. The fitting groove 4 is formed as rectangular recess part by outside fitting piece 6 positioned on the outer surface of the window glass G and inside fitting piece 7 positioned on the inner surface, wherein the outside fitting piece 6 and the inside fitting piece 7 rise respectively from the surface opposing end face Ga of the window glass G (referred to as fitting groove bottom 5 hereafter) toward the window glass G.

The fitting groove bottom 5 is formed as a flat face substantially parallel to the glass end face Ga. The case where adhesive material 8 is interposed between this fitting groove bottom 5 and the end face Ga is shown in FIG. 1. However the existence of this adhesive material 8 is a matter chosen suitably.

As described above, the seal lip part 3 is extended from the opposite side of a formation part of the fitting groove 4 in the base part 2, and the clearance between the window glass G and the body panels P is sealed by its distal end contacting with the face of the body panels P (roof part Pa) with urging force.

In addition, the quality of the material forming the base part 2 and the seal lip part 3 is widened for example from comparatively hard synthetic resin material or hard rubber material in order to heighten the maintenance power of the window glass G in the base 2, to comparatively elastic synthetic resin or rubber material in the seal lip part 3 in order to raise the adhesive property to the face of the body panels P, besides forming with the same material. In this case, the base part 2 and the seal lip part 3 are integrally formed by extruding and molding of two kinds of the material simultaneously.

Figure 2:
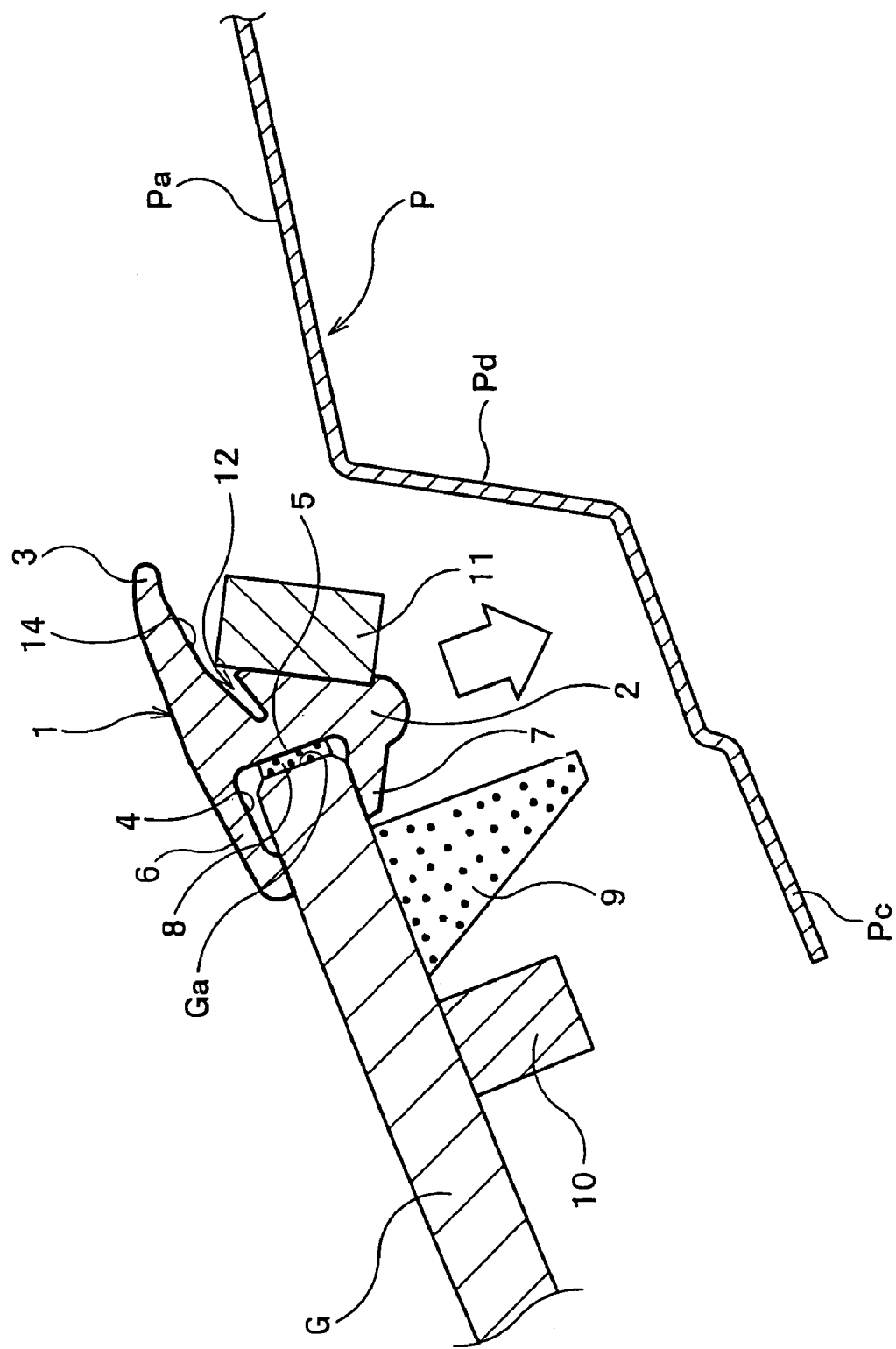
FIG. 2 is a sectional explanatory view of the circumference of the window molding before attaching to a vehicle body.

As shown in FIG. 2, the adhesive material 9 is applied to the inner surface of the window glass G in a state before fitting, and dumb rubber 10 is provided fixedly. After fitting, as shown in FIG. 1, the window glass G is fitted into the support part Pc of the body panels P through the dumb rubber 10. And on the outside of this dumb rubber 10, both of the window glass G and the window molding 1 are fixed to the support part Pc of the body panels P by the adhesive material 9.

In the window molding 1, notch 12 is formed at an inside of the vehicle body between the base part 2 and the seal lip part 3, i.e., on the face opposing a level difference part Pd of the body panels P raging from the part close to the inside fitting piece 7 in the base part 2 to the distal end of the seal lip part 3. Namely, according to this invention notch part 12 which serves as a recess part towards the end face Ga of the window glass G is formed in some part of the face opposing the level difference part Pd of the body panels P ranging from the part close to the inside fitting piece 7 to the distal end of the seal lip part 3 which is conventionally designed to be continuously formed as a straight surface or a loose curved surface. The notch 12 is formed as a groove formed toward the end face Ga of the window glass G. Float force of the seal lip part 3 is effectively prevented by formation of this notch part 12 as disclosed in JP-A-09-66739.

Now, this invention is mainly characterized in that seal member 11 is interposed between the base part 2 side from the notch 12 and the body panels P (level difference part Pd), in the window molding 1. The quality of the material of the seal member 11 consists of foamed rubber and the like. The seal member 11 assumes a sectionally rectangular form before fitting as shown in FIG. 2, and is fixed to window molding 1 and the like by the adhesive material which is not shown. And after fitting, as shown in FIG. 1, the seal member 11 is compressed by being sandwiched by the window molding 1 and the level difference part Pd so as to be elastically deformed and the hollow part surrounded by the window molding 1 and the body panels is sealed.

As described above, the window molding 1 is supported by the body panels P (level difference part Pd) through the seal member 11. This allows the fitting rigidity of the window molding 1 to be increased after fitting, even when the rigidity of the window molding 1 falls by formation of the notch part 12. When forming the seal member 11 as a separate unit from the window molding 1, it is adaptable to the window molding 1 including the existing notch part 12 formed therein.

Of course, the fixed site (bonding site) of the seal member 11 to the window molding 1 does not cover the part of the notch part 12 and limited to the base part 2 side from the notch part 12. Thereby the effect obtained by formation of the notch part 12, i.e., the effect that the float force of the seal lip part 3 is prevented is not spoiled.

Also, by forming the seal member 11, the capacity of the hollow part surrounded by the window molding 1 and the body panels P, i.e., the capacity of the hollow part of the inner side blockaded by the seal lip part 3 can be made small as much as possible. Therefore air is sucked out of the hollow part at the time of a vehicle run due to the internal and external atmospheric pressure difference sandwiching the seal lip part 3 for example, resulting in reducing the amount of the air. This results in decreasing the float force of the seal lip part 3 accordingly.

Furthermore, the seal lip part 3 is contacted with the body panels P (roof part Pa) in the distal end as described above, and contacted with the seal member 11 which was compressed and elastically deformed in the part close to the proximal end (base part 2 side is indicated) as shown in FIG. 1. Contact mode with the seal member 11 is satisfactory if some urging force is applied.

According to the above-described constitution, the seal lip part 3 is supported in two places of the body panels P and the seal member 11. This maintains the seal lip part 3 stably without denting the form thereof, and fatigue due to deformation can be reduced. Also, as shown in FIG. 1, by positioning the contacting portion with the seal lip part 3 and the seal member 11 on the part close to the distal end of the seal lip part 3 from the formation part of the notch part 12 for example, the hollow part of the inner side blockaded by the seal lip part 3 can be divided into hollow part 13a including the notch part 12, and hollow part 13b on the part close to the distal end of the seal lip part 3. Therefore, as described above in this case, when air is sucked out of the hollow part outside due to an atmospheric pressure difference, the sucked out air is limited to the hollow part 13b, to thereby reducing the amount of the air sucked out and the float force of the seal lip part 3 is suppressed further.

Furthermore, the face which opposes the vehicle body inner side in the seal lip part 3 is formed in flat surface 14, and this flat surface 14 is contacted with the seal member 11 so as to be mutually compressed. A "flat surface" here is not limited to an entire flat surface, but if it is continuously formed, it also includes a loose curved surface. According to this constitution, the seal lip part 3 can be contacted with the seal member 11 in a stable surface contact structure, therefore for example, the mutual sealing performance of the hollow part 13a and hollow part 13b improves, to thereby ensure the sucking of the air from the only hollow part 13b. Moreover, since the support area of the seal lip part 3 becomes large, the stability of the form of the seal lip part 3 improves, and fatigue due to deformation can be reduced more.

In the above, modes for carrying out the invention was explained. The notch part 12 may be partially formed in only the site of the roof part Pa, or only corner parts of the roof part Pa and the front pillar Pb. However in this case, according to this invention even when the notch 12 is formed, the interposition of the seal member 11 can raise the fitting rigidity of the window molding 1. Therefore, it becomes possible to form the notch 12 continuously covering the full length of the window molding 1. In addition, layout and form of each composite element and the like are not limited to the various embodiments as shown in the drawings, but can be varied in design freely within the scope of the gist of the invention.

INDUSTRIAL APPLICABILITY

According to this invention, even when the rigidity of the window molding itself falls by formation of notch, after fitting, the fitting rigidity of the window molding is increased by the interposition of a seal member. Also, capacity of the hollow part of the inner side blockaded by the seal lip part can be made small by providing a seal member, to thereby allow the amount of air to be decreased when the air is sucked out of the hollow part due to an internal and external atmospheric pressure difference, with the float force of the seal lip part also suppressed accordingly.

The invention claimed is:

1. A fitting structure of a window molding equipped with a base part attached in a circumferential edge of a window glass, and a seal lip part which extends toward body panels from the base part and is contacted with a surface of the body panels, wherein a notch part is formed in the window molding at an inside of a vehicle body between the base part and the seal lip part, and a seal member is provided between a base part side from the notch part and the body panels in the window molding, wherein the seal lip part is contacted with the body panels at a distal end thereof, and contacted with the seal member at a proximal end thereof.

2. A fitting structure of a window molding as claimed in claim 1, wherein the seal Up part is contacted with the seal member at a flat face formed at an inside of a vehicle body.

3. A fitting structure of a window molding as claimed in claim 1 wherein the seal member is compressed by the base part of the window molding and the body panels.

4. The fitting structure in accordance with claim 1, further including a vehicle comprising said window glass and said body panels.

5. A fitting structure as claimed in claim 1, wherein the seal member is a member separate from the base part.

* * * * *